Oct. 21, 1969    J. L. LEEPER    3,473,374
VEHICLE TESTING APPARATUS
Filed Aug. 11, 1967    2 Sheets-Sheet 1

JOHNNIE L. LEEPER
INVENTOR.

BY
Robert K. Rhea
AGENT

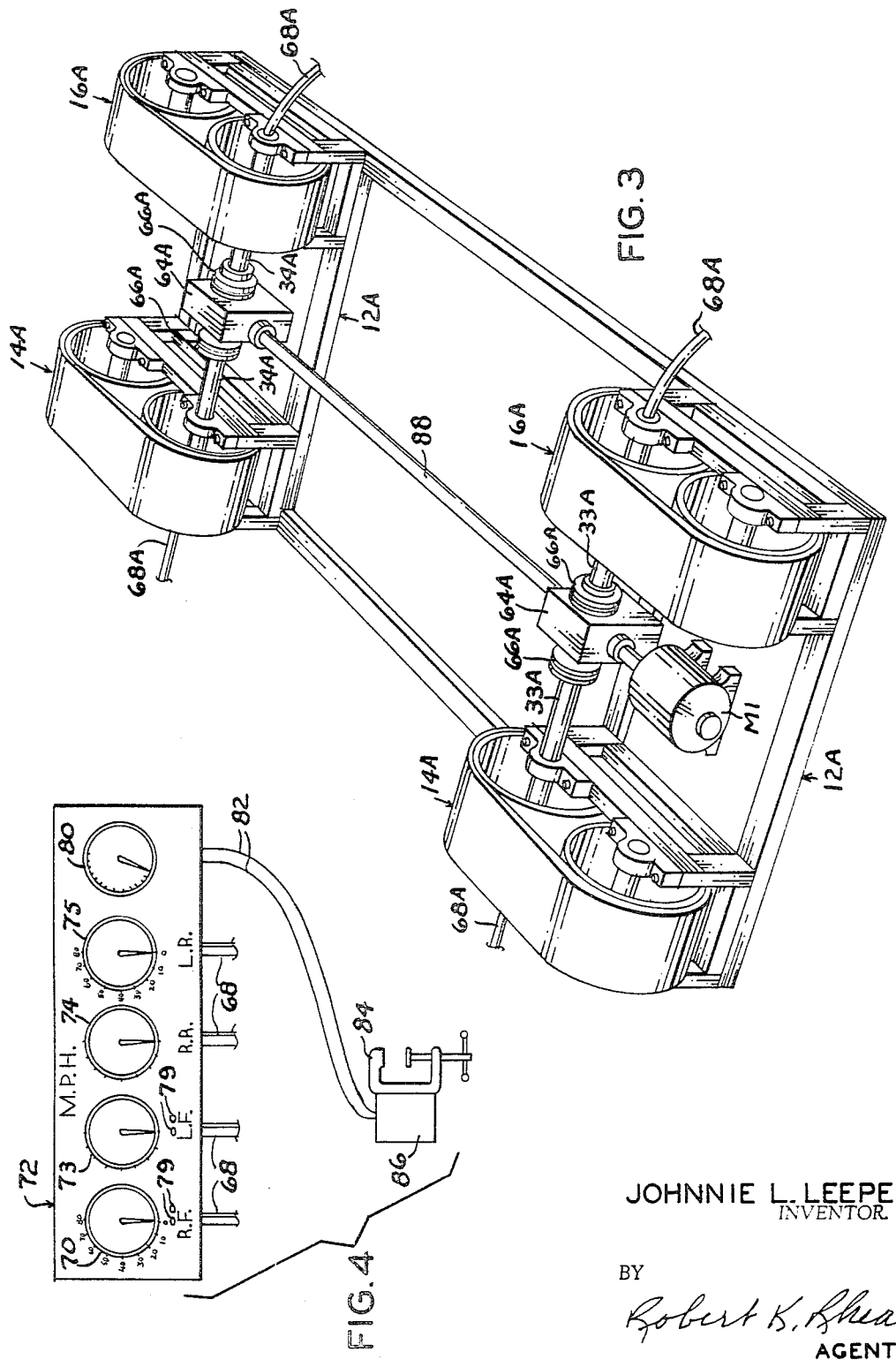

United States Patent Office 3,473,374
Patented Oct. 21, 1969

3,473,374
VEHICLE TESTING APPARATUS
Johnnie L. Leeper, 1013 SW. 57,
Oklahoma City, Okla. 73109
Filed Aug. 11, 1967, Ser. No. 660,119
Int. Cl. G01l 5/28
U.S. Cl. 73—124     1 Claim

ABSTRACT OF THE DISCLOSURE

Treadmills comprising pairs of drums, having a belt entrained around each pair, are journaled by a frame below the surface of a floor. A motor drives the treadmills when supporting vehicle wheels. A clutch, interposed between the motor and the pairs of drums, permits different rates of rotation to indicate braking efficiency while an electrical circuit, closed by lateral movement of the belts, indicates misalignment of the wheels. Obstructions on the belts induces vibration of the vehicle chassis with the intensity of vibration indicated by a dial.

Background of the invention

For vehicle efficiency of operation in prolonging the life of tires and to insure safety of operation it is desirable that vehicle wheel alignment and brake efficiency be checked periodically.

A number of front wheel alignment accuracy checking machines are presently in use but, so far as I know, these machines do not test the accuracy of brake operation or efficiency under simulated driving conditions. Furthermore, when vehicles generate a noise, such as squeaking, rattling or the like, due to vibration, which may be caused by an out-of-balanced tire or wheel, besides the desirability of a safe operating vehicle, it is desirable that these irritating vibrations or squeaking be eliminated.

The present invention provides a single machine which will safety check and indicate corrections to be made of wheel alignment, out-of-balance wheels or tires and locate, when desirable, squeaks, rattles or other vehicle noise by simulating road driving conditions.

A vehicle wheel alignment testing device is disclosed by Patent No. 3,252,224 which visually indicates alignment or misalignment of the vehicle under test, however, this device does not provide a simulated roadway driving condition for the wheels. Other patents have proposed testing brake efficiency, such as Patents Nos. 1,875,742 and 2,672,696 which employs pulley-like wheels for supporting the rear wheels of a vehicle being driven by the vehicle engine wherein fly wheels, or the like, simulate the inertia of the vehicle to test braking efficiency of the rear wheels. None of these patents suggest a vehicle wheel supporting means which drives the vehicle wheels under simulated road conditions so that wheel alignment, brake efficiency and vibration may be checked and the cause thereof located. These features are accomplished by the present invention.

Summary of the invention

The present invention provides at least two pairs of drums journaled by a frame within a recess in a floor with a belt entrained around each pair of drums to form treadmills. The surface of the belts have means thereon simulating roadway conditions. A motor is drivably connected with the respective pairs of drums through friction clutches which compensates for the different velocities of the belts when the vehicle brakes are applied for testing the latter. An electrical circuit energized by switches closed by lateral movement of the belts indicates misalignment of vehicle wheels while a vibration intensity pickup, connected with the vehicle chassis or body, indicates vehicle vibration generated by the means on the belts simulating roadway conditions.

The principal object of this invention is to provide a means for simulating roadway conditions by driving the vehicle wheels for operational safety check and efficiency of the vehicle.

Brief description of the drawings

FIGURE 3 is a perspective view of an alternate embodiment of the device; and,

FIGURE 4 is an elevational view of the vehicle brake and wheel alignment test panel and vibration intensity pick-up.

Description of the preferred embodiments

Figure 1:
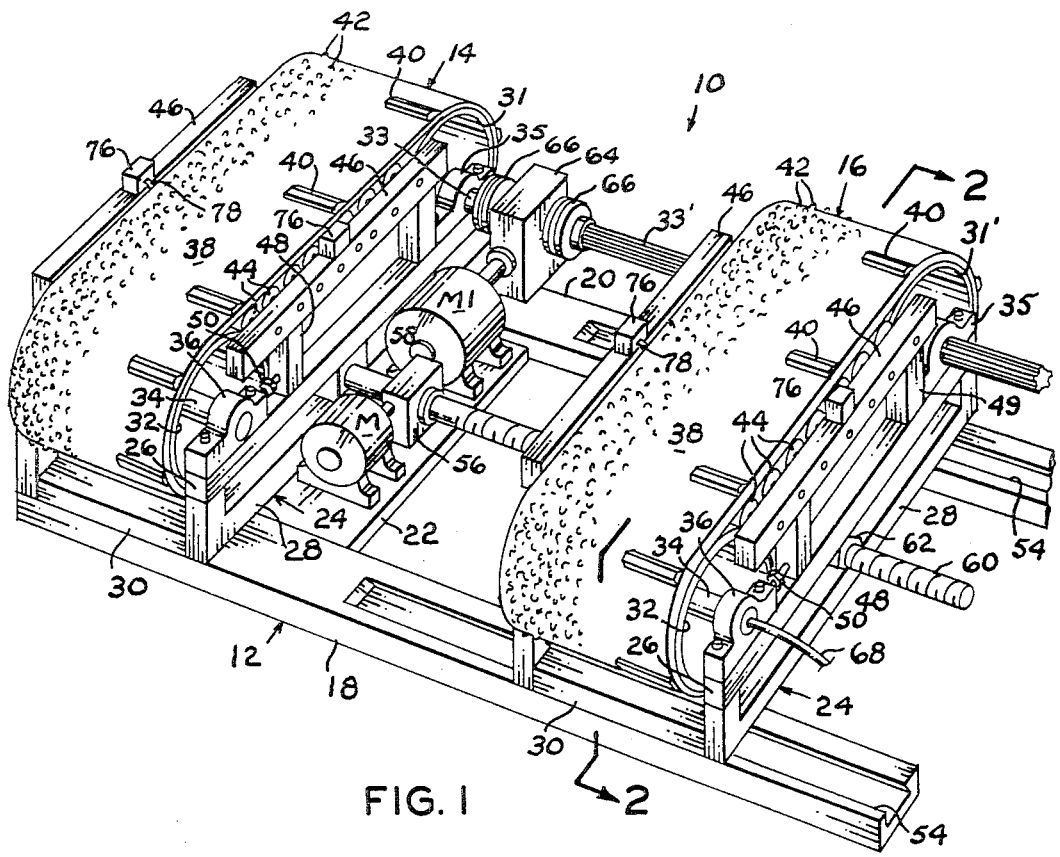
FIGURE 1 is a perspective view of the device, per se.

Like characters of reference designate like parts in those figures of the drawings in which they occur.

Figure 2:
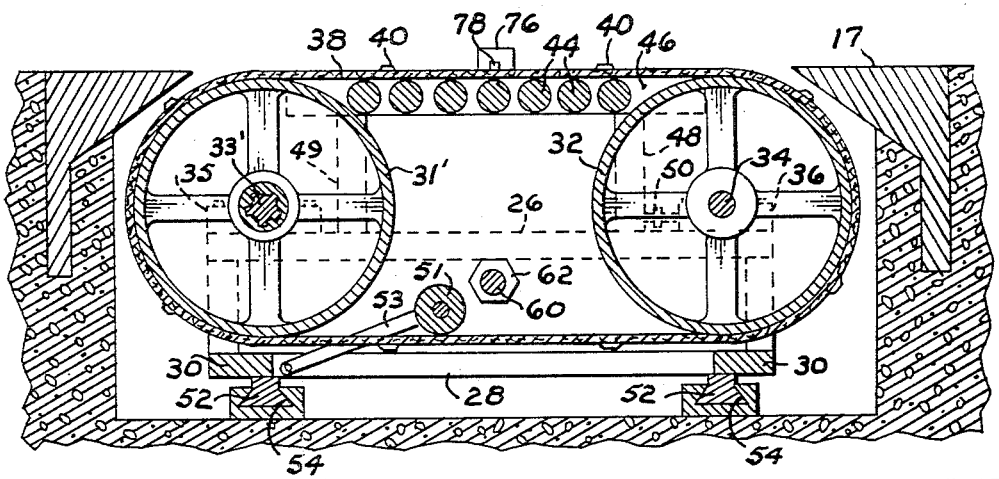
FIGURE 2 is a vertical cross-sectional view taken substantially along the line 2—2 of FIG. 1 and illustrating the relationship of the device with respect to a vehicle supporting surface.

In the drawings:

The reference numeral 10 indicates the device, as a whole, comprising a frame 12 and a pair of treadmills 14 and 16. The frame 12 is preferably installed within a recess below the surface 17 of a floor (FIG. 2). The frame 12 comprises a pair of base members 18 and 20 interconnected in parallel spaced relation by a cross member 22. Since the treadmills are substantially identical, only the treadmill 14 will be described in detail with the differences in structure of the treadmill 16 described hereinafter. The treadmill 14 is supported by an open-type frame 24 extending transversely of the base members 18 and 20 including upper and lower horizontal supports 26 and 28, respectively, joined in parallel spaced relation by cross members 30. A pair of drums 31 and 32 are mounted transversely of the support frame 24 adjacent its respective ends by axles 33 and 34 in turn journaled by bearings 35 and 36. The bearings 36 are adjustable longitudinally of the frame supports 26 for the reasons presently explained. A belt 38 is entrained around the drums 31 and 32. The spacing between the drums and the resultant length of the belt is varied in accordance with the desired horizontal span for the respective belt and the width of the belt is substantially greater, for example, more than three times the width of the largest sized tire of a vehicle wheel to be tested. Adjacent one of its sides, the belt 38 is provided with a plurality of parallel longitudinally spaced-apart outstanding projections 40 secured to its outer surface and transversely of the belt. The length of the projections is preferably substantially one-third the transverse width of the belt. The opposite longitudinal side edge portion of the belt 38 is provided with a plurality of outstanding randomly positioned, in relatively close spaced relation, irregular-shaped protrusions 42 to simulate a gravel surfaced roadbed. The width of the band of protrusions is substantially equal to one-third the transverse width of the belt, thus, the longitudinally extending central substantially one-third portion of the belt remains smooth to simulate a paved roadbed. The upper horizontal expanse of the belt between the drums 31 and 32 is supported by a plurality of idling rollers 44 extending transversely of the belt and contacting its depending surface. The rollers 44 are journaled at their respective ends by a horizontally extending bar 46 mounted on uprights 48 and 49 in turn supported by the frame support 26. Belt tension is maintained by an adjusting screw 50 interposed between the respective upright 48 and the adjustably mounted drum bearing 36. A belt tension or idling roller 51 extends transversely of each belt 38 in contact with the upper surface of its lower horizontally disposed portion. The respective roller 51 is pivotally connected with the frame support 28 by an arm 53.

The support frame 24 of the treadmill 16 is provided with wedge-shaped foot portions 52 (FIG. 2) which are cooperatively received within dove tail grooves 54 formed in the upper surface of the base members 18 and 20 for lateral movement of the treadmill 16 toward and away from the treadmill 14. This lateral movement is accomplished by a reversible motor M mounted on the base frame cross member 22 which drives a gear train 56. The gear train 56 is secured to the support frame 24 by a brace 58. The gear train drives a threaded shaft 60 which projects transversely through the support frame 24, of the treadmill 16, and through nuts 62 secured to the frame so that operation of the motor in its respective direction moves the treadmill 16 toward and away from the treadmill 14.

The respective treadmills 14 and 16 are driven by a motor M1 similarly mounted on the base member 22 and drivably connected with a gear train 64. The gear train 64 is connected to the axle 33. The axle 33' of the treadmill 16 is elongated to extend through broached or internally splined sleeves within its bearings 35 and is cooperatively externally splined for movement of the bearings longitudinally of the splined axle 33'. Similarly the hub of the drum 31' of the treadmill 16 is cooperatively broached to slidably fit the splined axle 33'. A friction clutch 66 is interposed between the gear box 64 and the respective axle 33 and 33' for the purposes presently explained.

One end of the axles 34 is coaxially connected with a substantially conventional speedometer cable 68 which is in turn connected to a speedometer 70 mounted on a panel 72 remote from the device 10. Similarly other speedometers 73, 74 and 75 are mounted on the panel 72 and connected with treadmill axles driving the respective wheels of a vehicle.

A microswitch 76 is mounted on the respective support 46 at opposing sides of each belt. The microswitches are individually connected with lamps 79 mounted in pairs on the panel 72 to indicate "in" or "out" misalignment of the respective wheel. Each of the microswitches includes an arm 78 which projects toward the marginal side edge of the respective belt for the purposes presently explained.

A vibration intensity indicator 80 is mounted on the panel 72 and connected by wiring 82 with a vibration intensity pick-up 84 in turn connected with a C-clamp 86 for attaching the pick-up 84 to a selected portion of the vehicle frame or body.

Referring now to FIG. 3, an alternative embodiment of the device is illustrated comprising two pairs of treadmills 14A and 16A, one for each wheel of the vehicle and cooperatively spaced therefor. The respective treadmills 14A and 16A are similarly mounted on base frames 12A with the exception that the treadmills 16A are not movable laterally of the treadmills 14A and are interconnected in a similar manner by gear boxes 64A, friction clutches 66A and respective axles 33A and 34A. The motor M1 drives both pairs of the treadmills 14A and 16A by a drive shaft 88 extending between the gear boxes 64A. Similarly the interconnected axles 33A and 34A are each in turn coaxially connected by speedometer cables 68A to the respective panel speedometers 70, 73, 74 and 75.

Operation

In operation the device 10 is installed in a recess below the surface of the floor 17 so that the upper horizontally disposed surfaces of the treadmill belts 38 substantially lie in the plane of the floor. The spacing between the treadmills 14 and 16 is adjusted for the particular vehicle to be tested, not shown, so that the front or rear wheels thereof may be driven onto the treadmills with the wheels positioned in the central longitudinally extending smooth portion of the respective belts. This spacing between the treadmills is accomplished by operating the motor M in the desired direction to move the treadmill 16 toward or away from the treadmill 14 by means of its screw 60. If, for example, the front wheels are being tested, the motor M1 is started to drive the treadmills. Misalignment of either or both of the front wheels tends to move the respective belt laterally of its direction of travel so that a marginal side edge of the affected belt then contacts the arm 78 of the respective microswitch 76 which lights the respective one of the lamps 79 on the control panel indicating that wheel alignment is necessary.

The motor M1 drives the belts and wheels in the same direction and at a desired velocity indicated by the miles per hour reading of the respective speedometer. The vehicle brakes are applied and the resulting braking effect on the wheels is indicated by the respective speedometers to visually determine equal or unequal adjustment of braking efficiency.

Undesirable noise or vibration of the vehicle is detected by connecting the vibration pick-up 84 to a selected portion of the vehicle chassis or body and, with the motor M1 driving the respective treadmills, the front wheels are turned toward the projections 40 which simulates "washboard" surfaces of a roadway. The intensity of vibration is visually observed on the vibration indicator 80. Alternatively the wheels may be turned toward the other side of the treadmill belts to position the wheels over the simulated gravel roadbed for checking vibration for vehicle noises on such surfaces.

Operation of the alternative embodiment shown by FIG. 3 is substantially identical to the above described operation with the exception that this embodiment may be used for checking brake efficiency of each individual wheel of the vehicle simultaneously.

Obviously the invention is susceptible to some change or alteration without defeating its practicability, and I therefore do not wish to be confined to the preferred embodiment shown in the drawings and described herein.

I claim:

1. A vehicle testing apparatus, comprising: frame means mounting a pair of treadmills, said treadmills adapted to support vehicle wheels thereon, said treadmills each comprising a pair of drums, said drums each having an axle projecting through and journaled by said frame means, and a belt entrained around each respective said pairs of drums; means for driving said treadmills comprising a motor mounted on said frame means, a gear train driven by said motor and in turn driving the axles of at least one said drum of each said pairs of drums, a friction clutch interposed between said gear train and the respective axle of said driven drums; roadbed simulating means on said treadmills; means connected with said treadmills for indicating wheel alignment conditions comprising a microswitch mounted on said frame means adjacent the respective side edge of each said belt, said microswitches each having an arm projecting toward said belts, a like number of lamps mounted remote from said treadmills, and wiring connected with a source of electrical energy and interconnecting each said microswitch with the respective said lamp; and means connected with said treadmills for indicating braking efficiency.

References Cited

UNITED STATES PATENTS

| | | | |
|---|---|---|---|
| 1,189,709 | 7/1916 | Logan et al. | 73—123 X |
| 1,452,783 | 4/1923 | Bishop | 73—123 |
| 1,872,543 | 8/1932 | Wilkes | 73—124 |
| 1,887,721 | 11/1932 | Saunders | 73—124 |
| 1,911,725 | 5/1933 | Taber | 33—203.13 |
| 2,130,900 | 9/1938 | Presbrey | 73—134 X |

RICHARD C. QUEISSER, Primary Examiner

J. W. MYRACLE, Assistant Examiner

U.S. Cl. X.R.

33—203.13